(No Model.)
C. P. VOLLAND.
HAIR CUTTING MACHINE.
No. 583,005. Patented May 18, 1897.
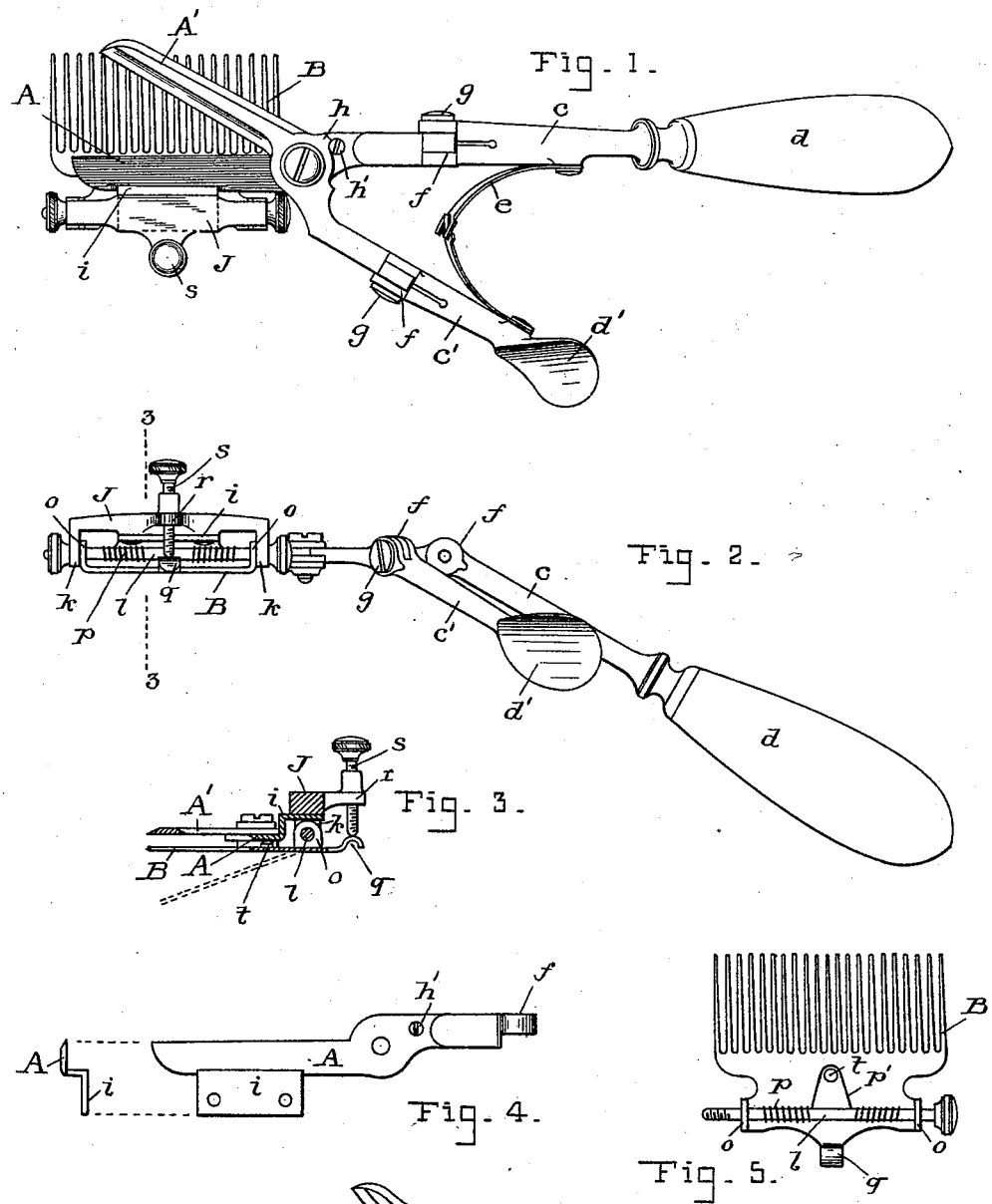
WITNESSES:
Lee J. Van Horn
Chapin A. Ferguson
INVENTOR:
Conrad P. Volland
By
Chas. B. Mann
ATTORNEY.

UNITED STATES PATENT OFFICE.

CONRAD PAUL VOLLAND, OF BALTIMORE, MARYLAND, ASSIGNOR, BY DIRECT AND MESNE ASSIGNMENTS, TO JOHNATHAN E. MOXLEY AND JOHN WEIKART, OF SAME PLACE.

HAIR-CUTTING MACHINE.

SPECIFICATION forming part of Letters Patent No. 583,005, dated May 18, 1897.

Application filed September 25, 1896. Serial No. 606,971. (No model.)

*To all whom it may concern:*

Be it known that I, CONRAD PAUL VOLLAND, a citizen of the United States, residing at Baltimore, in the State of Maryland, have invented certain new and useful Improvements in Hair-Cutting Machines, of which the following is a specification.

This invention relates to an improved hair-cutter for trimming hair on the human head. The object of the invention is to combine a pair of shears, a comb, and improved connections and adjustments whereby a person can safely use the hair-cutter for trimming his own hair.

The invention is illustrated in the accompanying drawings, in which—

Figure 1 is a top or plan view of the hair-cutter. Fig. 2 is a side view of same. Fig. 3 is a cross-section on the line 3 3, shown in Fig. 2. Fig. 4 is a view of one blade of the shears. Fig. 5 is a view of the comb, rod, and spring separated from the shears. Fig. 6 shows a curved form of shear-blade.

The letter A designates one blade of the shears, which carries the comb B, and A' designates the other blade. In the present instance the shank $c$ of said comb-blade has a handle $d$, which may be grasped by the fingers of the hand, while the shank $c'$ of the other blade has a thumb-piece $d'$, to be operated by the thumb of the same hand. A spring or in this case two springs $e$ serve to press the two shanks apart, and thus separate the blades. Each shank has a handle attached by a joint whose pintle $f$ is at a right angle with respect to the pivot of the blades and a set-screw $g$ in each joint, by means of which the joint may be so tightened as to be inflexible. These jointed shanks enable the two blades and comb to be tilted at an angle with respect to the handle and thumb-piece, as shown in Fig. 2. A suitable stop-shoulder $h$ and pin $h'$ limit the spread or separation of the two blades.

The comb-blade A has an angle-flange $i$, projecting both up and laterally, and a carrier-bar J is rigidly attached to said flange. At each end this carrier-bar has an ear $k$, through both of which a rod $l$ passes. The comb B is pivoted on this rod. In the present instance the comb has two laterally-bent ears $o$, which pivot on said rod, and a spiral spring $p$ is coiled about the rod and fastened thereto, while a portion $p'$ projects and bears on top of the comb-plate. (See Fig. 5.) This projecting part of the spring serves to press the pivoted comb downward or away from the blade, as indicated in Fig. 3 by broken lines. The comb has at its back a central rear projection $q$, and the carrier-bar J also has a rear projecting arm $r$. An adjusting-screw $s$ passes down through said arm, and the end of the screw impinges against the projection $q$ on the comb-plate. It will be seen that the comb may be tilted by its pivot-ears rocking on the rod $l$, and that the screw $s$ will regulate this tilting and hold the comb at any desired angle or position.

The comb-plate has a short stop-pin $t$ projecting upward above its top surface. When the comb is tilted up toward the blade A as far as it should be tilted, this pin $t$ will be in contact with the said blade, (see Fig. 3,) and then serves to retain the comb in that position.

By using this hair-cutter a man can trim his own hair and can cut it uniformly all over his head in the manner known as "shingling."

Having thus described my invention, what I claim is—

1. A hair-cutter comprising in combination two shear-blades crossing each other and pivoted together to cut the hair; a carrier-bar, J, rigidly attached to one of said blades; a comb pivoted to said carrier-bar; a spring which serves to exert pressure on the comb to force it to tilt in one direction; and an adjusting-screw which tilts the comb in the opposite direction.

2. A hair-cutter comprising in combination two shear-blades crossing each other and pivoted together to cut the hair; a carrier-bar, J, rigidly attached to one of said blades; and having at each end an ear; a rod passed through the ears; a comb pivoted on said rod; a spring on said rod and acting on the comb to press and tilt it in one direction; and an adjusting-screw held by said carrier-bar to tilt the comb in the opposite direction, as set forth.

In testimony whereof I affix my signature in the presence of two witnesses.

CONRAD PAUL VOLLAND.

Witnesses:
CHARLES B. MANN, Jr.,
L. I. VAN HORN.